United States Patent Office 2,809,698
Patented Oct. 15, 1957

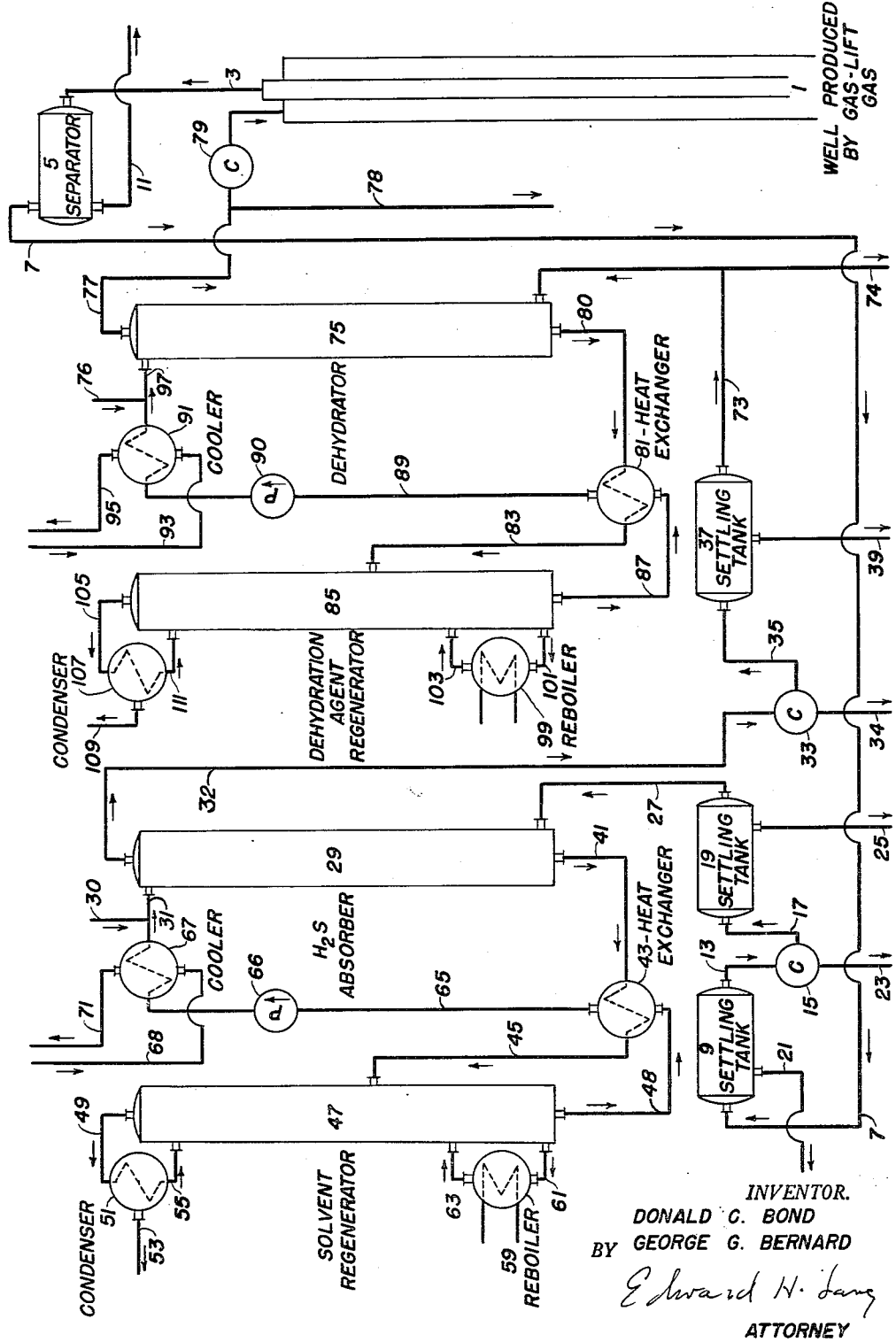

2,809,698

PROCESS FOR REDUCING SCALE DEPOSITION IN GAS-LIFT WELLS

Donald C. Bond and George G. Bernard, Crystal Lake, Ill., assignors to The Pure Oil Company, Chicago, Ill., a corporation of Ohio Application October 27, 1954, Serial No. 464,988

5 Claims. (Cl. 166—8)

This invention relates to a process for increasing the production of an oil well. More particularly, this invention relates to a process for increasing the production of oil from a gas-lift well by preventing and/or reducing carbonate scale deposition within said well.

In many oil wells deposits of such substances as paraffin wax, asphalt, sand, and soluble alkaline earth compounds, and similar materials in objectionable quantities on well equipment such as tubing, casings, strainers and the working barrels of well pumps decrease to a marked degree the oil production from said wells and necessitate frequent well shutdowns for cleaning operations and equipment repairs. In recent years various compounds, such as monochlorobenzene, hydrogenated naphthalene, tetralin sulfonic acid and the like, have been prepared and utilized for the purpose of cleaning and preventing corrosion during oil well operations, as well as inhibiting clogging and plugging of oil well equipment. Such substances have been added either continuously or intermittently to oil wells during production or during well shutdowns and have been more or less successful with regard to some of the major types of deposits tending to clog oil well equipment and the corrosive characteristics of the formation fluid.

When oil is being produced from a limestone reservoir, not only are the usual contaminating materials encountered but a particularly serious problem arises due to the deposition of calcium carbonate and other alkaline earth carbonates within the well during recovery operations. Usual methods for maintenance of wells such as gas-lift wells producing from limestone formations in a free and unclogged condition are relatively expensive and time-consuming and ultimately may reduce the total productivity of the well. Where a gas-lift type of operation is utilized in connection with a limestone formation, the calcium carbonate deposits as a scale both on the tubing above the gas-lift valves and in the gas-lift valves themselves during oil recovery operations.

Calcium carbonate is slightly soluble in pure water. When carbon dioxide is present in the water, the essentially water-insoluble calcium carbonate is converted to a greater or lesser extent, depending upon the concentration of carbon dioxide, into water-soluble calcium bicarbonate. The reaction takes place in the following manner:

$$CaCO_3 + H_2O + CO_2 = Ca(HCO_3)_2$$

The amount of calcium carbonate that can be dissolved is, as mentioned above, a function of the partial pressure of carbon dioxide. In the upper part of a well conditions of relatively low temperature and pressure exist, so that the partial pressure of dissolved carbon dioxide is very low, but at great depths, such as in a water-bearing limestone formation or at the bottom of a well penetrating such a formation, the temperature and pressure are such that large partial pressures of carbon dioxide may be present; the amount of calcium carbonate which may be present dissolved in water with the carbon dioxide therefore is relatively great. Before a water-bearing and oil-bearing limestone formation is tapped, the water exists in a state of equilibrium with the calcium carbonate, but as soon as the formation is tapped and partially depleted of its contents conditions change; the high pressure at the formation site is released and much of the dissolved carbon dioxide in the oil- and water-containing formation liquid leaves the solution in the form of gas. This decrease in carbon dioxide content of the formation liquid in turn is responsible for deposition of some of the calcium carbonate from solution. The pressure and temperature continue to decrease relative to the formation liquid as said formation liquid ascends within the well bore, so that calcium carbonate deposition from the formation liquid in the form of an insoluble scale or precipitate occurs along the flow path to the upper surface of the well. Therefore, well equipment in contact with the formation liquid along its flow path becomes coated with a hard layer of calcium carbonate. When an appreciable amount of calcium carbonate has become deposited within the well bore, not only is the flow path narrowed, but the working parts of the well equipment operate inefficiently and production of oil decreases.

While temperature and pressure changes are mainly responsible for the deposition of calcium carbonate scale, dehydration also asserts a contributing effect. Dehydration takes place when dry gas is used in the gas-lift production of wells. The rate of calcium carbonate deposition within the well during production of oil depends not only on the above factors but also on the rate of flow, the depth of the producing formation and other factors. Such calcium carbonate deposition is frequently sufficiently extensive to materially reduce by plugging and clogging of oil well lines the amount of oil obtained from the well over a given period of time. In Dollarhide Ellenburger wells, for example, employing gas-lift oil production techniques the deposition of calcium carbonate scale within the well may be due to the following circumstances: Natural gas produced from the Dollarhide Ellenburger formation has been reported to contain about 0.75 mol. percent of carbon dioxide and a variable amount of hydrogen sulfide. The raw gas is usually passed into a Girbotol unit wherein both the carbon dioxide and hydrogen sulfide are removed; the gas is then dried and a portion of the carbon dioxide-free dry gas is then used to operate the gas-lift wells. Since the raw gas contains carbon dioxide a certain amount of dissolved calcium bicarbonate is present in the water being produced with the desired oil. The processed gas-lift gas is free of carbon dioxide when said gas-lift gas contacts the water in the water-and-oil mixture issuing from the limestone formation and carrying the dissolved bicarbonate. The addition of the gas-lift gas to the oil-water mixture reduces the concentration of carbon dioxide by dilution so that a smaller amount of calcium bicarbonate can be maintained in water solution; the result is that calcium carbonate deposits as a scale in the well and on the well equipment. The fact that the gas-lift gas is dry when added to the well accentuates the carbonate deposition, since a certain amount of water evaporates and the water concentration drops, thereby concentrating the dissolved bicarbonate salts beyond the saturation point for calcium carbonate and causing further deposition of calcium carbonate.

We have found that by the use of an integrated process incorporating the use of a carbon dioxide-containing gas as part or all of the gas-lift gas, calcium carbonate deposition during the oil recovery operation can be eliminated or substantially prevented, so that costly repair shutdowns and equipment losses, together with reduced oil production are avoided. It has been found that a relatively small increase in the partial pressure of carbon dioxide causes a relatively large increase in the amount of carbonate which can be held in the formation fluid as dissolved calcium bicarbonate. Accordingly, it is an object of this invention to provide a method for increasing the production of gas-lift wells operating from water-bearing limestone formations. It is another object of this invention to provide a method for preventing the deposition of calcium carbonate scale during gas-lift oil recovery operations. It is still another object of this invention to provide a method for economical utilization of carbon dioxide-containing well gas for the increased productivity of gas-lift wells. It is still another object to provide an integrated economical process for the purification of carbon dioxide-containing well gas and its utilization as gas-lift gas in the recovery of oil from a water-bearing limestone formation. It is still another object of this invention to provide an integrated process for the purification and utilization of well gas to prevent carbonate scale deposition within a gas-lift well tapping a water-bearing limestone formation. Other objects will be obvious to one skilled in the art.

In general, our invention comprises the use of carbon dioxide-containing gas as a means of preventing carbonate scale formation in an oil well. More particularly, this invention relates to an integrated process for increasing the production of oil by the gas-lift technique, whereby well gas obtained during said process is first stripped of hydrogen sulfide without loss of carbon dioxide or with only partial loss of carbon dioxide, then dehydrated, and thereafter utilized as lift-gas to prevent the formation of calcium carbonate scale and to reduce existing deposits of said scale within the well and on and in the well equipment during operations tapping a water-bearing limestone formation.

Many processes have been proposed for the removal of hydrogen sulfide from industrial and other gases. Among these are nonregenerative processes which are uneconomical for large quantities of hydrogen sulfide and which are typified by the caustic soda solution method, the potassium permanganate solution method and the sodium bichromate-zinc sulfate method. A regenerative, nonrecovery process is the Seaboard process employing aqueous sodium carbonate. Steam stripping of the sodium carbonate solution instead of using air changes the method to a regenerative, hydrogen sulfide recovery process. The Girbotol process, developed originally by the Girdler Corporation, is the process most widely used at the present time for the removal of hydrogen sulfide. It employs aqueous solutions of mono-, di-, and triethanolamine. At low temperatures, the amines, like ammonia, form salts with hydrogen sulfide which dissociate readily upon heating. During regeneration, the volatile hydrogen sulfide separates from the relatively nonvolatile amine. Steam generated by boiling the amine solution is commonly employed to strip the hydrogen sulfide therefrom and regenerate the amine for further hydrogen sulfide absorption. This method furnishes complete removal of hydrogen sulfide with relatively low steam requirements for regeneration.

The use of aqueous tripotassium phosphate to remove hydrogen sulfide is also well known. Processes are also available for the recovery of hydrogen sulfide from the gas as sulfur, but in many cases incomplete hydrogen sulfide removal prevents widespread usage.

Hydrogen sulfide is present to some extent in most oil well gases and where the gas is to be dehydrated, the hydrogen sulfide should first be removed in order to prevent corrosion and fouling in the dehydration unit. Most of the above methods for the removal of hydrogen sulfide are inadequate for the purposes of our invention, however, since they remove carbon dioxide indiscriminately with the hydrogen sulfide and it is an important point in our process to retain the carbon dioxide in the well gas. It has been found, however, that an aqueous solution of a tertiary amine, such as triethanolamine or methyldiethanolamine, when utilized in a process such as the Girbotol process, reacts much more rapidly with the hydrogen sulfide present in the well gas than with the carbon dioxide also present, so that most, if not all, of the carbon dioxide can be retained in the treated gas. The tripotassium phosphate process also attains selectivity to a large extent, due to a faster reaction rate with hydrogen sulfide than with carbon dioxide, but high hydrogen sulfide removal efficiency usually cannot be obtained.

The subsequent dehydration of the well gas in the step of our process concerned with the preparation of the gas mixture for use as gas-lift gas may be accomplished by the use of triethylene glycol, diethylene glycol, monoethylene glycol or another suitable desiccant, solid or liquid. Diethylene glycol has been found to be the most satisfactory, since it has an improved dew-point depression and is substantially non-corrosive under usual operating conditions. Suitable solid desiccants include certain clays and silica gels, asbestos, charcoal, phosphorus pentoxide, aluminum oxide, magnesium oxide, calcium oxide, calcium bromide, calcium chloride, zinc chloride, zinc bromide, copper sulfate and similar compounds.

In order to more adequately describe our invention, reference is now made to the schematic-flow diagram accompanying this specification. This schematic-flow diagram depicts a particular embodiment of the invention. An oil- and gas-production fluid mixture produced from well 1 by a gas-lift gas passes from well 1 through line 3 into separator 5 which may be of any conventional type. Well 1 may be any type of oil well producing from a limestone or other formation which contains oil and also water in which calcium bicarbonate is present, as well as carbon dioxide and $H_2S$. Well 1 is produced in the schematic-flow diagram by any gas-lift technique, but any other well-producing technique may be utilized, since carbon dioxide may be added to the system in obvious ways other than as gas-lift gas. The gas-oil-water mixture issues from the well which may be operating at 200–1000 p. s. i., usually about 200 p. s. i. The separator may operate at superatmospheric or atmospheric pressure and usually is provided with an automatic liquid run-off means, suitable for batch or continuous operation.

In said separator 5, after suitable time and under the usual conditions of separation, known liquid components are removed through line 11, while gaseous components are removed from separator 5 through line 7 and pass to and into settling tank 9, which is also known as a knock-out drum to one versed in the art and may be of any suitable design. In settling tank 9, the pressure and temperature are approximately those encountered in separator 5, and liquid materials settle from the gas and are removed through line 21; water vapor also condenses therein and is removed. The remaining gas passes out of settling tank 9 through line 13 and into compressor 15 operating at a pressure sufficiently high to condense easily condensible hydrocarbons present as impurities in the well gas. Compressor 15 is of any conventional type, such as a one- or two-stage type, and size. Materials condensed during compression are removed from compressor 15 through line 17 and into settling tank 19, which may be of any conventional type and size, where again it is subjected to suitable settling conditions, including pressure approximately that encountered in compressor 15, so as to recover therefrom liquid materials (easily condensible hydrocarbons not condensed in settling tank 9 and not removed through line 23 from compressor 15). Said liquid materials pass from settling tank 19 through line 25 and out of the system, while uncondensed gas passes out of settling tank 19 through line 27 and up into the lower portion of an apparatus 29 adapted for the removal of hydrogen sulfide from said gas.

Apparatus 29 may be any type of countercurrent contacting device, such as a countercurrent vertical absorber made of steel pipe, and may be packed with any type of suitable packing material, such as steel or porcelain Raschig rings, glass beads or steel, porcelain or glass rods, and the like, so as to effect suitable countercurrent contact between the rising hydrogen sulfide-containing well gas and the descending hydrogen sulfide-removing agent. The absorber optionally may be equipped with contacting trays or baffles and the like. The hydrogen sulfide-containing gas rises countercurrent to a selective solvent, such as an aqueous solution of methyl-diethanolamine, triethanolamine, or tripotassium phosphate, or other agent for the selective removal of the hydrogen sulfide which passes down said apparatus 29 and which has been introduced to apparatus 29 through line 30 and line 31. Make up solvent is introduced as required.

Well gas stripped of substantially all hydrogen sulfide passes out of apparatus 29 through line 32 and thence into compressor 33 which may be of any suitable type and which operates at a sufficiently higher pressure than compressor 15 whereby such condensible constituents still remaining in the gas, as hydrocarbons of the gasoline boiling range, are for the most part condensed, for example, pentanes and the like, and substantially completely removed from the system through line 34, and, after passage of the gas through line 35, to settling tank 37 through line 39. Settling tank 37 operates at approximately the pressure of compressor 33 and may be of any conventional type.

Spent or enriched solvent passes out of apparatus 29 through line 41 and into heat exchanger 43 operating at suitable conditions of temperature and pressure and which may be of the twin G-fin or any other conventional type. The solvent is heated therein to a temperature sufficiently high to dissociate the compound formed between the hydrogen sulfide and hydrogen sulfide-removing agent. The heated, enriched solvent from said heat exchanger apparatus 43 passes out from line 45 into solvent regenerator 47 at a point above the bottom thereof. Said solvent regenerator 47 may be any suitable separator apparatus, such as a bubble-cap or plate-type separator or the like, to effect adequate separation of hydrogen sulfide from the solvent or hydrogen sulfide-removing agent, and operates at decreased pressure, such as 5 p. s. i. g. Regenerated solvent passes from solvent regenerator 47 through line 48 and flows to heat exchange apparatus 43 wherein it furnishes necessary heat to said heat exchange apparatus 43 to effect the above-mentioned heating of enriched solvent. Effluent from solvent regenerator 47, comprising mainly hydrogen sulfide with possibly some entrained solvent, passes from said regenerator 47 through line 49 and into condenser 51 which incorporates a settling area. Condenser 51 operates at sufficient temperature and pressure to condense solvent present. Effluent waste gas comprising hydrogen sulfide is removed from condenser 51 through line 53 while condensed utilizable solvent passes from condenser 51 through line 55 and into solvent regenerator 47. A reboiler 59 is also provided near the base of solvent regenerator 47, which may be of any conventional type. Liquid reaching the bottom of solvent regenerator 47, comprising solvent which may contain residual hydrogen sulfide, is circulated through line 61 into reboiler 59, wherein it is heated sufficiently to ensure substantially complete removal of hydrogen sulfide therefrom, and then through line 63 back to the regenerator 47 in which the hydrogen sulfide passes up through solvent regenerator 47 and thence through line 49, condenser 51 and line 53. Lean solvent is returned to solvent regenerator 47 from reboiler 59 through line 63 and, as mentioned above, passes out of said regenerator 47 through line 57 to heat exchange apparatus 43. After cooling in heat exchange apparatus 43, lean solvent passes through line 65 and pump 66 to cooler 67 which provides cooling means comprising water introduced through line 68 and circulating through to line 71. The lean, regenerated solvent after passing through cooler 67 enters line 31 and is conducted therein to a point near the top of apparatus 29 for reuse in removing hydrogen sulfide from newly introduced hydrogen sulfide-containing well gas.

After the well gas which has been treated for the removal of hydrogen sulfide has passed through line 32, compressor 33, line 35, and settling tank 37, as previously described, it is removed from settling tank 37 through line 73 from which gas may be removed from the system through line 74. In the practice of this invention, part or all of the gas is charged to dehydrator 75. Dehydrator 75 may be of any suitable type such as a bubble-cap or plate-type tower absorber or a packed-type of absorber, packed with such packing as steel, porcelain or glass Raschig rings, rods and the like. The dehydrator may be run under any suitable conditions, such as 600 p. s. i. g. or other pressures. The temperature may be any suitable temperature, such as 70–90° F. In said dehydrator 75 said well gas rises and countercurrently contacts a suitable dehydration agent, such as calcium chloride, monoethylene glycol, diethylene glyuol or triethylene glycol and the like, preferably diethylene glycol, which has entered dehydrator 75 through line 76 and line 97, in the case where the process has just begun to operate, and only through line 97 after spent dehydration agent has been regenerated. Well gas which has been dehydrated by countercurrently contacting with the suitable dehydration agent in dehydrator 75 for a sufficient length of time, passes from said dehydrator 75 through line 77 and compressor 79 to well 1 for use as gas-lift gas in the recovery of oil from the water- and oil-bearing formation by the gas lift process. Compressor 79 increases the pressure of the carbon dioxide-containing gas to a sufficient degree so that said gas serves as efficient gas-lift gas, that is, a pressure of 200–1000 p. s. i. g. If desired, treated well gas passing through line 77 may be diverted in part into line 78 for further processing or uses other than as gas-lift gas. Spent dehydration agent settles to the bottom of dehydrator 75 and is removed therefrom by line 80 into heat exchange apparatus 81 operating at a temperature sufficiently high to convert water present with the dehydration agent to a gas, that is, for example, 220° F. at atmospheric pressure, but insufficient to convert the dehydration agent to a gas. The heated, spent dehydration agent passes from said heat exchange apparatus 81 through line 83 into dehydration agent regenerator 85 operating at conditions suitable for the satisfactory separation of the water vapor from the dehydration agent. The regenerator 85 may be any suitable type of separator, such as a plate-type or other separator. Regenerated dehydration agent free of water vapor is removed from apparatus 85 through line 87 and conveyed therein to heat exchange apparatus 81. After an appropriate heat exchange in apparatus 81, wherein regenerated solvent is cooled and furnishes heat for the above-mentioned heating of spent dehydration agent, said regenerated dehydration agent is removed therefrom through line 89 and pump 90 into cooler 91 and cooled therein by means of water running through line 93 and leaving said cooler 91 through line 95. After cooling in cooler 91, said regenerated dehydration agent passes therefrom through line 97 and into dehydrator 75 for recontacting of newly introduced water-containing well gas.

Effluent from the contacting in the dehydration agent regenerator 85 passes from said system through line 105 and into condenser 107 which incorporates a settling area and which operates above the boiling point of water at the particular pressure desired but below the boiling point of the dehydration agent; after appropriate settling in condenser 107, waste effluent largely comprising water vapor passes therefrom through line 109, and condensed, reuseable dehydration agent is recycled to apparatus 85 through line 111. A reboiler 99 is provided at or near the bottom of dehydration agent regenerator 85 whereby regenerated dehydration agent settling to the bottom of said apparatus 85 may be reheated to assure complete removal of any entrained water. Said dehydration agent is drawn through line 101 into reboiler 99, which may be any suitable type and operates at above the boiling point of water for the particular pressure of the dehydration regenerator, but below the boiling point of the dehydration agent. Water vapor and dehydration agent pass from said reboiler 99 through line 103 into dehydration regenerator 85 wherein said water vapor rises and is removed therefrom by line 105 and from the system by passage through condenser 107 and line 109. As above mentioned, regenerated dehydration agent free of water vapor passes from apparatus 85 through line 87 to heat exchanger 81.

Other appropriate equipment obvious to one skilled in the art may be used in addition to or in substitution for the equipment described. We do not wish to be limited in our invention to the above specifically disclosed information. This invention may be operated batchwise, semicontinuously or continuously. This invention may also be appropriately used with well operations other than in operations by the gas-lift technique. Wherever carbonate scale formation is encountered during well production our process suitably modified in an obvious manner can be used. That is, instead of adding the carbon dioxide-containing well gas to the well as gas-lift gas, said carbon dioxide-containing well gas can be added directly to the formation by suitable means or can be intermingled with the formation fluid in small or large amount continuously or intermittently during well producing operations or while the well is otherwise shut down. The gas can be used both to prevent carbonate scale deposition and to remove said carbonate scale from both the well equipment and the well itself.

*Example one*

A non-limiting example of our invention is as follows:
A well gas comprising essentially

| Component: | Mol percent |
|---|---|
| $H_2S$ | 0.07 |
| $CO_2$ | 0.62 |
| $N_2$ | 6.88 |
| $CH_4$ | 66.22 |
| $C_2H_6$ | 13.18 |
| $C_3H_8$ | 7.50 |
| Iso-$C_4H_{10}$ | 0.53 |
| n-$C_4H_{10}$ | 3.00 |
| Iso-$C_5H_{12}$ | 0.37 |
| n-$C_5H_{12}$ | 0.73 |
| Hexanes plus | 0.90 |
| | 100.00 | and obtained from a gas-lift oil well operating at 25 p. s. i. g. is passed to an oil-gas separator of the conventional type operating at 20 p. s. i. g. and ambient temperature. Gas is removed from said separator and passed through a scrubber operating at 20 p. s. i. g. wherein materials such as natural gasoline are recovered by settling out. Said effluent is then passed to a single-stage compressor operating at 80 p. s. i. g. and thence to a second scrubber operating at the same pressure wherein condensed hydrocarbons settle out and are removed therefrom.

The effluent from said second settling tank is passed to an apparatus for countercurrently contacting said gas with a solvent selective for hydrogen sulfide, said solvent being 20 parts of methyldiethanolamine in 80 parts of water and said apparatus being an absorber of the bubble-cap-tray type operating at 80 p. s. i. g., 90° F., and 25 cu. ft. $H_2S$ absorbed per cu. ft. of methyl diethanolamine treating ratio. After appropriate contacting, the $H_2S$-stripped gas is passed to a second single-stage compressor and a third scrubber. In said latter scrubber, entrained treating solution settles out. For further purification, the well gas stream is run into a dehydrator operating at 80° F. and which employs diethylene glycol. Said well gas is contacted therein countercurrently with dehydrating agent at a temperature of 80° F., pressure of 625 p. s. i., and treating ratio of 10 gal. of 95% diethylene glycol per 1,000 standard cubic feet of gas. After dehydration, said gas is passed through a compressor wherein the pressure is increased to 1,000 p. s. i. g. and thence to the producing well for use as gas-lift gas; said treated well gas has approximately the following composition:

| | Mol percent |
|---|---|
| $H_2S$ | 0 |
| $CO_2$ | 0.5 |
| $N_2$ | 7.9 |
| $CH_4$ | 71.1 |
| $C_2H_6$ | 13.3 |
| $C_3H_8$ | 5.2 |
| Iso-$C_4H_{10}$ | 1.6 |
| Iso-$C_5H_{12}$ | 0.2 |
| n-$C_5H_{12}$ | 0.1 |
| Hexanes plus | 0.1 |
| | 100.0 |

Spent solvent from the solvent-contacting step is continuously regenerated, after passage through a heat exchanger, in a solvent regenerator comprising a bubble-cap-tray column and operating at 215° F. top temperature and 5 p. s. i. g., wherein hydrogen sulfide is removed. The regenerator is fitted with a reboiler which increases the temperature to 270° F. and a condenser operating at 200° F. to recover solvent from the hydrogen sulfide effluent. Lean solvent is recycled after passage through said heat exchanger where it is cooled to about 100° F. and through a pump and water-operated condenser where it is cooled to about 80° F.

Spent dehydration agent containing moisture is regenerated, after passage through a heat exchanger operating at 200° F., in an apparatus comprising a bubble-cap-tray column and operating at 200° F. and 5 p. s. i. g. The regenerator is fitted with a reboiler operating at 300° F. and a condenser, the latter to recover any dehydrating agent entrained in water vapor effluent from the regenerator. The regenerated dehydration agent is recycled to the dehydration unit after passage through said heat exchanger, where it is cooled to about 100° F., and through a pump and a water-cooled condenser where it is cooled to about 85° F.

We claim:

1. A process for increasing the oil production from a gas-lift well producing from a limestone formation which comprises the steps of removing a predominantly hydrocarbon gas and oil mixture from the well and separating therefrom gas containing moisture, carbon dioxide and hydrogen sulfide, thereafter passing said gas to a zone wherein substantially all hydrogen sulfide present is removed by countercurrent contact with aqueous methyldiethanolamine without concomitant removal of the major portion of therein-contained carbon dioxide, passing said well gas stripped of hydrogen sulfide to a dehydration zone and countercurrently contacting said well gas with diethylene glycol dehydration agent, and re-injecting said dehydrated, hydrogen sulfide-free, carbon dioxide-containing well gas into said gas-lift well as gas-lift gas under pressure into contact with oil in said well and producing further quantities of oil from said well.

2. A process for increasing oil production from a gas-lift well producing from a limestone formation which comprises removing a predominantly hydrocarbon gas and oil mixture from the well and separating therefrom gas containing carbon dioxide, hydrogen sulfide and moisture, treating the separate gas in such manner as to remove therefrom substantially all the hydrogen sulfide and moisture contained therein without removing the major portion of its carbon dioxide content, and reinjecting said dehydrated, hydrogen sulfide-free, carbon dioxide-containing gas into said well as gas-lift gas under pressure into contact with oil in said well and producing further quantities of oil from said well.

3. The improvement in accordance with claim 2 in which the hydrogen sulfide is removed by contact with a liquid which selectively absorbs hydrogen sulfide in preference to carbon dioxide under the conditions of treatment.

4. A process for substantially completely removing hydrogen sulfide from hydrocarbon gas containing hydrogen sulfide and carbon dioxide without removing the major portion of the carbon dioxide therefrom comprising contacting said gas with a solution composed of 20 parts of methyldiethanolamine and 80 parts of water at a pressure of about 80 pounds per square inch and a temperature of about 90° F.

5. In a process for increasing oil production from a gas-lift well by injection therein of hydrocarbon gas produced from said well, which gas as produced contains hydrogen sulfide and carbon dioxide, the step of removing substantially all the hydrogen sulfide from said gas without removing the major portion of the carbon dioxide therefrom, prior to said injection, by contacting the gas with a solution composed of 20 parts of methyldiethanolamine and 80 parts of water at a pressure of about 80 pounds per square inch and a temperature of about 90° F.

References Cited in the file of this patent
UNITED STATES PATENTS

| | | |
|---|---|---|
| 656,466 | Minor | Aug. 21, 1900 |
| 1,934,472 | Allen et al. | Nov. 7, 1933 |
| 2,083,213 | Baehr et al. | June 8, 1937 |
| 2,148,592 | Taylor | Feb. 28, 1939 |
| 2,156,234 | Bays | Apr. 25, 1939 |
| 2,174,336 | Walker et al. | Sept. 26, 1939 |
| 2,177,068 | Hutchinson | Oct. 24, 1939 |
| 2,477,314 | Scharmann | July 26, 1949 |
| 2,592,762 | Taylor et al. | Apr. 15, 1952 |